US009738494B2

(12) United States Patent
Shubel et al.

(10) Patent No.: US 9,738,494 B2
(45) Date of Patent: Aug. 22, 2017

(54) OVERHEAD CRANE SAFETY AWARENESS LIGHTING SYSTEM AND METHOD

(71) Applicant: Mazzella Lifting Technologies, Inc., Cleveland, OH (US)

(72) Inventors: Mark Shubel, Tuscaloosa, AL (US); Kenneth Wright, Tuscaloosa, AL (US)

(73) Assignee: Mazzella Lifting Technologies, Inc., Cleveland, OH (US)

( * ) Notice: Subject to any disclaimer, the term of this patent is extended or adjusted under 35 U.S.C. 154(b) by 0 days.

(21) Appl. No.: 15/099,767

(22) Filed: Apr. 15, 2016

(65) Prior Publication Data

US 2016/0304326 A1    Oct. 20, 2016

Related U.S. Application Data

(60) Provisional application No. 62/149,219, filed on Apr. 17, 2015.

(51) Int. Cl.

| | |
|---|---|
| *B66C 15/06* | (2006.01) |
| *B66C 13/04* | (2006.01) |
| *B66C 19/00* | (2006.01) |
| *B66C 13/18* | (2006.01) |
| *B66C 13/46* | (2006.01) |
| *B66C 17/00* | (2006.01) |
| *B65G 63/00* | (2006.01) |

(52) U.S. Cl.
CPC .............. *B66C 15/06* (2013.01); *B66C 13/04* (2013.01); *B66C 13/18* (2013.01); *B66C 13/46* (2013.01); *B66C 17/00* (2013.01); *B66C 19/00* (2013.01); *B66C 19/002* (2013.01); *B65G 63/004* (2013.01)

(58) Field of Classification Search
CPC ......... B66C 13/18; B66C 13/04; B66C 15/06; B66C 19/00
See application file for complete search history.

(56) References Cited

U.S. PATENT DOCUMENTS

| | | | |
|---|---|---|---|
| 1,712,650 A | 5/1929 | Clark | |
| 5,117,221 A | 5/1992 | Mishica, Jr. | |
| 6,115,129 A | 9/2000 | Holmquist et al. | |
| 8,104,186 B2 | 1/2012 | Raschella et al. | |
| 2003/0214415 A1* | 11/2003 | Shaw | B66C 13/44 340/685 |
| 2012/0144682 A1* | 6/2012 | Vinati | B66C 13/46 33/263 |
| 2012/0182541 A1* | 7/2012 | Canham | G01C 3/08 356/5.01 |

(Continued)

FOREIGN PATENT DOCUMENTS

GB    WO2013182677 A1 *  12/2013 ............. B66C 13/40

*Primary Examiner* — Mohamed Barakat
(74) *Attorney, Agent, or Firm* — Roger D. Emerson; Emerson Thomson Bennett, LLC

(57) ABSTRACT

Provided is a safety lighting system for an overhead crane comprising a laser generator capable of generating a laser signal; and a crane control system having a programmable logic circuit; wherein the laser generator is integrated with the crane control system; and wherein the laser generator is operable to project a laser signal onto a surface corresponding to the position of the crane or crane components and a method of using the safety lighting system to determine when an object has crossed into a designated safety zone.

18 Claims, 8 Drawing Sheets

(56) References Cited

U.S. PATENT DOCUMENTS

2013/0187785 A1* 7/2013 McIntosh .............. B66F 17/006
340/686.6
2014/0190919 A1* 7/2014 Rosberg ................. B66C 19/02
212/179

* cited by examiner

OVERHEAD CRANE SAFETY AWARENESS LIGHTING SYSTEM AND METHOD

CROSS REFERENCE TO RELATED APPLICATIONS

This non-provisional application claims priority to U.S. Provisional Patent Application Ser. No. 62/149,219, filed on Apr. 17, 2015.

TECHNICAL FIELD

This invention relates generally to an overhead crane safety awareness lighting system. More particularly, present invention provides an integrated, directionally driven laser system operably integrated with a crane control system that is able to provide information about movement or location of the crane or crane components to workers through generation of one or more images projected on a surface.

BACKGROUND

In industrial plants it is common practice to handle materials of all kinds by means of cranes and derricks, and particularly by means of overhead travelling cranes. These overhead cranes cover, in their travel, a large area of the plant footprint, and consequently, pass and carry their loads over the workers below. Thus, the workers are constantly subjected to the hazards associated with movement of the overhead cranes and their loads. Safety measures are often used in order to alert workers located below the cranes to the presence of material being passed overhead.

When products are being transported through the use of a crane, it is common for damage to the products to occur. The most common occurrence of such damage involves the loading and unloading of the goods. Mechanisms that are able to aid the crane operator in the placement of the product can help to minimize the problem of damaging the cargo being loaded and unloaded. However, many mechanisms that attempt to aid the crane operator require that the operator shift attention away from the product and reference a secondary instrument used to provide feedback.

U.S. Pat. No. 1,712,650 is directed to a safety device for overhead cranes. The safety device includes a light projector used to project a highly concentrated intense spot or beam of light upon the floor of the shop at a desired point relative to the crane load. Such a spot or light will travel over the floor as the crane moves and will define the path traversed by the crane load. The projected light is intended to warn of possible danger of the movement of crane loads overhead. Such a device is limited to an intense spot beam that is to be projected onto the shop floor in relation to the relative location of the crane or load located overhead.

U.S. Patent Application Publication US 2012/0144682 is directed to a device for locating a load in lifting plants. A projector may be used for assisting with a lifting plant. The device for locating loads is designed to be applied to a cable- and/or chain- and/or hydraulic-type lifting plant, in which the plant includes a lifting system to which a gripping element for a load is connected via a cable or chain system, and is provided with a projector for projecting visual indications correlated with the position of the displacements of the load.

U.S. Pat. No. 6,115,129 is directed to a Laser Guided Loading System. The system utilizes a pair of lasers positioned on a cargo pick-up unit that are aligned to produce beam lines that intersect at a known height, h, below the bottom surface of the cargo. As the cargo is lowered onto the surface, the laser lines appear to move towards each other. When the laser lines overlap, an operator knows the cargo is positioned at the height, h, above the surface. An additional laser is oriented in the diagonal direction so as to give the operator an indication of the distance between the cargo and the bulkhead.

JP Patent Document 05-229784 is directed to an Under-Crane Safety Monitoring System wherein a laser scan means projects a conical colored laser beam film under a member transferred by the crane boom. The laser scan means are controlled by a control device to let an inclination angle of the laser beam film follow the movement of the member. The laser beam film provides a visual signal of the movement of the member.

What is needed is a system that is able to provide for an efficient manner of aiding the crane operator in loading and unloading cargo through means of a system integrated with the crane control system while also providing the workers below the crane with a safe working environment.

SUMMARY

Provided is an overhead crane safety awareness lighting system integrated with a crane control system able to provide information about the crane or crane components to workers through generation of one or more images projected onto a surface, for example, a factory floor. The system is able to provide directional safety awareness lighting for use on overhead cranes and crane components (e.g., bridge girders, trollies and hoists) to notify operators and other workers as to the movement of the crane or crane components as it moves overhead. The system is further operable to assist the crane operator or other worker with positioning the crane hooks directly over the item to be lifted thereby improving positioning of the load.

The safety lighting system for an overhead crane can have a laser generator capable of generating a laser signal, and a crane control system having a programmable logic circuit. The laser generator can be integrated with the crane control system and can be operable to project a laser signal onto a surface corresponding to the position of the crane or crane components.

Also provided herein is a method of using the safety lighting system to determine when an object has crossed into a designated safety zone.

DETAILED DESCRIPTION

Figure 1:
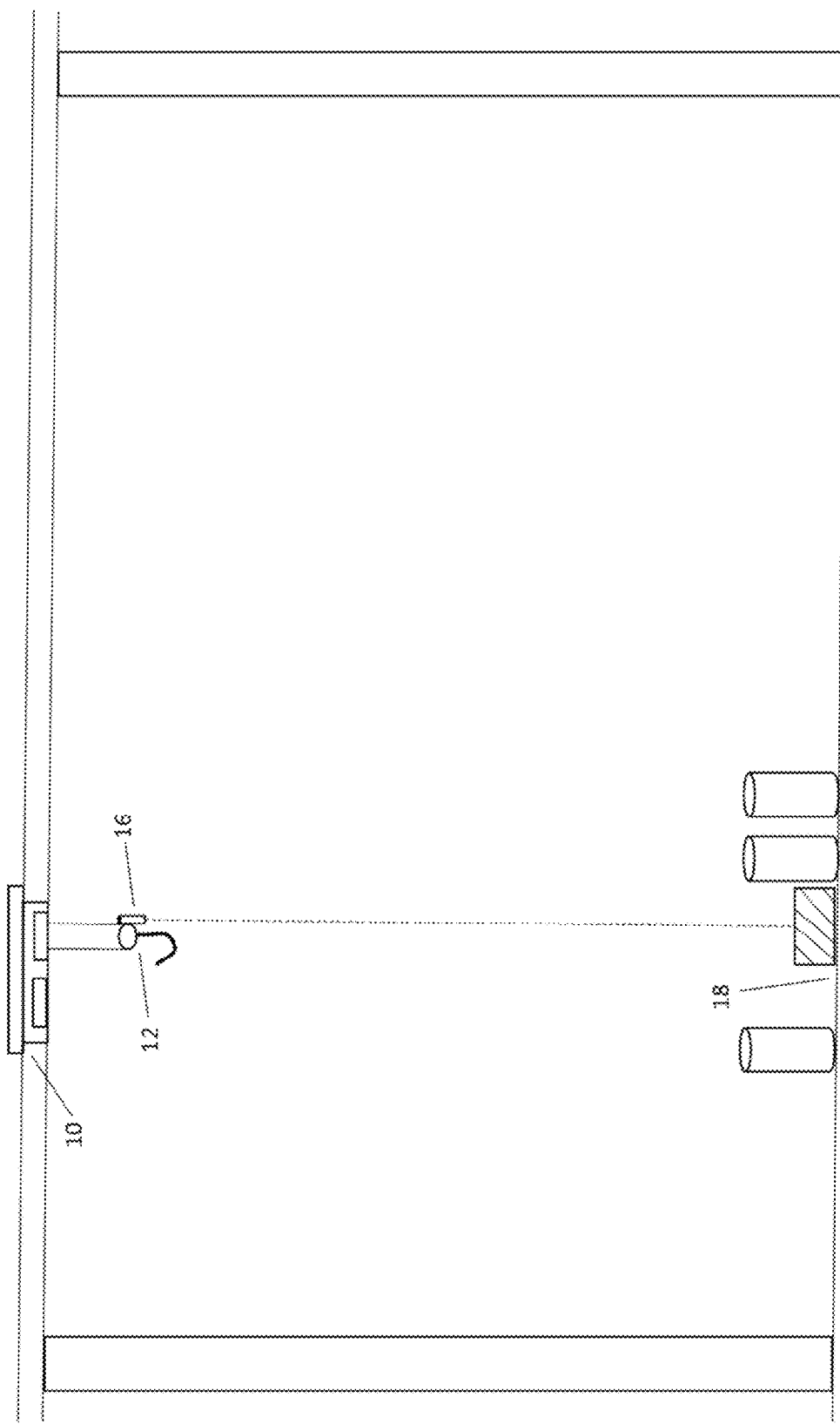
FIG. 1 is an embodiment of the invention as installed on an overhead crane.
Figure 2:
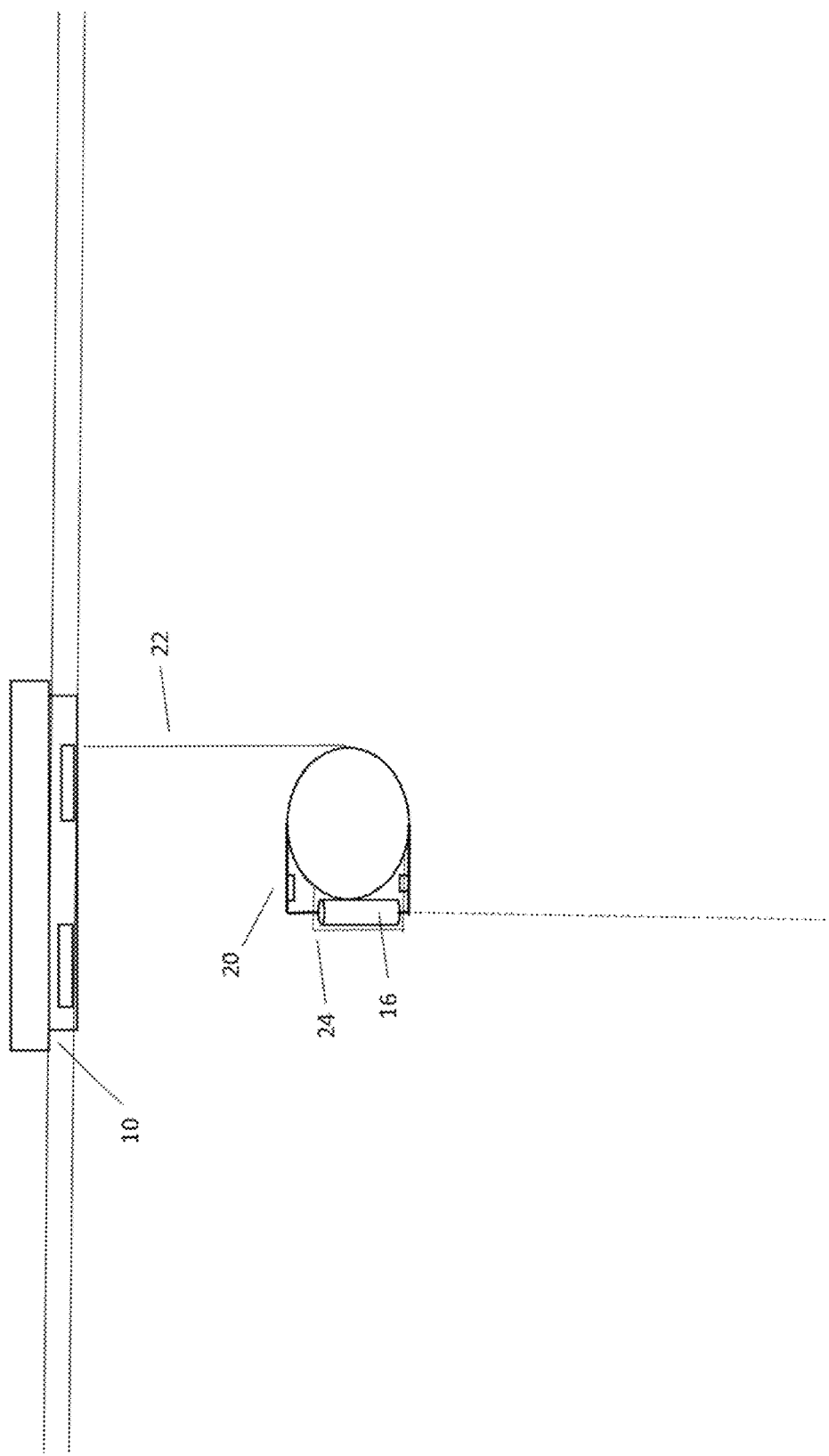
FIG. 2 is another embodiment of the invention.

With reference to FIG. 1, a laser system can operate in coordination with an overhead crane 10. The laser system is affixed to a structure, such as the crane hook 12, the crane runway structure 14, or any other surface capable of supporting the laser system. In one embodiment, the laser system can include one or more laser generators 16 used to provide information such as movement indication or positioning of the crane or crane components. The laser generator 16 can be used to alert workers beneath the crane of the presence of the crane or load overhead, to assist the crane operator in loading or unloading the crane, or any other task known by those skilled in the art that could be aided through the use of a laser generated light.

With continued reference to FIG. 1, the laser generator 16 may be a "green-line" generator or any other laser generator chosen with sound engineering principles to accomplish the desired function. According to one embodiment, the laser generator 16 may be an eye safe red line laser generator, a blue laser generator, or any other laser generator capable of performing the task of this invention as chosen by those skilled in the art. The laser generator 16 may be utilized alone or in cooperation with multiple laser generators, to project one or more lines, a predetermined pattern or patterns, or more sophisticated information such as graphics and/or text onto the target surface. The laser generators 16 may be used to project any representation of light onto a target surface that can be used to aid a crane operator and/or surrounding persons in the operation of a crane. The target surface can be the factory floor 18, a face of a building, a face of a load being carried by the overhead crane, or any other surface that is capable of displaying a visual laser projection. By way of one example, one or more laser generators 16 may be utilized to project a pattern, such as a cross-hatch pattern, a basket-weave pattern, or any other pattern that may be projected onto the target surface to signify the position and movement of the crane hook 12. According to one embodiment, multiple laser generators 16 of contrasting colors can be used to project a pattern.

According to one embodiment, use of a cross-hatch pattern, or any other projected pattern, will allow for both safe and efficient use of the crane from a production standpoint as well as serve to minimize wear and tear on the structural, mechanical and electrical components of the crane. The use of a projected pattern may allow for more direct loading and unloading of cargo, thereby decreasing the frequency of the crane hook 12, or any other physical component of the crane, coming into unwanted contact with other structures located nearby.

According to one embodiment, the safety awareness lighting system can include at least one laser generator 16 to provide information about an overhead crane, such as location and directional movement of the overhead crane or crane components. The laser generator 16 may be integrated with the crane control system, for example, to operate in concert with the operation of the crane or crane components. The integration with the crane control system can allow the laser generator 16 to vary the laser towards the target surface in coordination with the movement of the crane. The precision of this integrated movement exceeds that of the laser generator 16 being dependent on the external movement of the crane hook 12, or any other structure or surface that to which the laser generator 16 can be attached.

According to one embodiment, multiple laser generators 16 of differing colors can be used to signify different events or zones. By way of an example, a green-line laser can be used to signify movement in a first direction or at a first range of distance and a red laser generator can be used to signify movement in a second direction or at a second range of distance. In the example wherein different colors signify direction, this could assist those around the crane in quickly determining whether the crane is moving towards them or away from them. In the example wherein different colors signify a range of distance, this could assist the crane operator in determining the distance to the target load or the target unloading zone. By way of non-limiting example, the green laser could be activated when the target is at a distance of greater than five feet while the controller could automatically activate a red laser when the desired target is within a distance of less than five feet. The desired operation range of the multiple laser system can be chosen depending upon the desired application of the lighting system.

With reference to FIG. 2 and FIGS. 5-8, one embodiment of the safety awareness lighting system may be adapted to isolate or minimize vibrations encountered during use. In one example, a system may include mounting brackets 20 capable of vibration isolation, which may include shocks, adjustment capabilities, means to integrate with the crane control system, associated wiring harnesses 22, or any other form of vibration isolation known to those skilled in the art.

According to one embodiment, the laser generator 16 can be a "green line generator" having a rugged solid state design using green line generator diodes in conjunction with customized optics to both shape and shift the laser output light intensity along the entire length of the laser line. This may include intensifying the output light at a specified distance away from the laser generator 16, shaping the width of the output light at a specified distance away from the laser, or any other possible manipulation of the laser line related to either the shape or intensity.

According to one embodiment, laser systems that are able to generate graphics and/or text can be used in carrying out the purposes of the invention. These graphics may include predetermined pictures, textual characters ordered so as to formulate words, or any other graphic and/or text that may be used to accomplish the purpose of the invention. By way of one example, the laser system can display text indicating safe or unsafe areas for surrounding workers to be present.

With continued reference to FIG. 2 and FIGS. 5-8, an embodiment is shown where the laser generator 16 and any other components of the laser system may be encased in housing 24 so as to minimize environmental exposure, contamination, or any other harmful contact present at the location of the laser generator 16. By way of one example, the system may be housed in a dust and moisture resistant aluminum or brass housing. The case may be manufactured from any material that can serve the function of protecting components of the laser generator 16 from environmental exposure, contamination, or any other harmful contact that may be present within the working environment. The housing 24 may be supported by mounting brackets 20 configured for adjustments or vibration isolation to minimize laser misalignment during use.

According to one embodiment, the laser generator 16 and other components may be housed in NEMA or ISO rated enclosures having vibration isolation characteristics to offset vibrations, shock, collisions with other structures, or any other common occurrence known to those skilled in the art that may occur during loading or unloading of the crane to minimize laser misalignment during such use.

According to one embodiment, a steel cased structure that encloses the laser system and attaches to the desired surface or structure through a series of brackets containing shocks so as to stabilize the laser system from any unwanted vibrations. Other housing and mounting solutions may be utilized as understood by those having skill in the relevant art.

According to one embodiment, a safety awareness lighting system may comprise control systems with a fully integrated electrical enclosure including disconnects, fusing, wiring circuits, electrical and electronic components, and programmable logic controllers (for integration into the crane operating system). Any other equipment needed for integrating the safety awareness lighting system with the crane control system, as identified by those skilled in the art, may be used within the scope of this invention.

According to one embodiment, the safety awareness lighting system can be provided as a kit. Such a kit can include the laser system, including at least one laser generator 16, one or more mounting brackets for the laser system, an enclosure to act as housing 24 and protect the laser system, and a means for integrating the safety awareness lighting system with the crane control system. In other embodiments, the safety awareness lighting system may be adapted for retro-fitting onto existing overhead cranes. Such an embodiment would be able to be fitted directly onto the overhead crane 10. A further embodiment would allow for the laser system to be affixed directly to the crane hook 12.

According to one embodiment, the safety awareness lighting system may be adapted to fit onto any surface which may support mounting brackets. This may include a wall, a structure made from any type of durable material, such as steel, brass, or any other metal, or any other surface that may be suitable for performing the desired function of this invention as identified by one of skill in the art.

According to one embodiment, the kit can adapted to provide a method of "Zone Control" through the visual indication of the lasers onto the shop floor when the crane or its load approach these safe zones.

Figure 3:
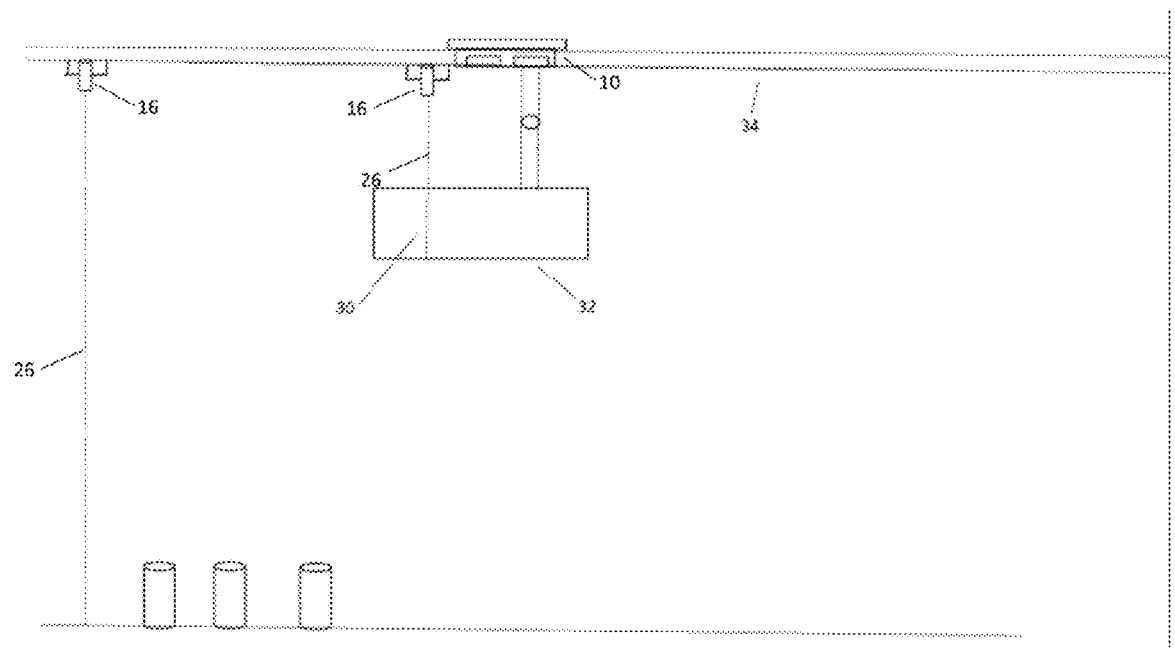
FIG. 3 is a drawing of an embodiment as used in conjunction with a designated safe zone.
Figure 4:
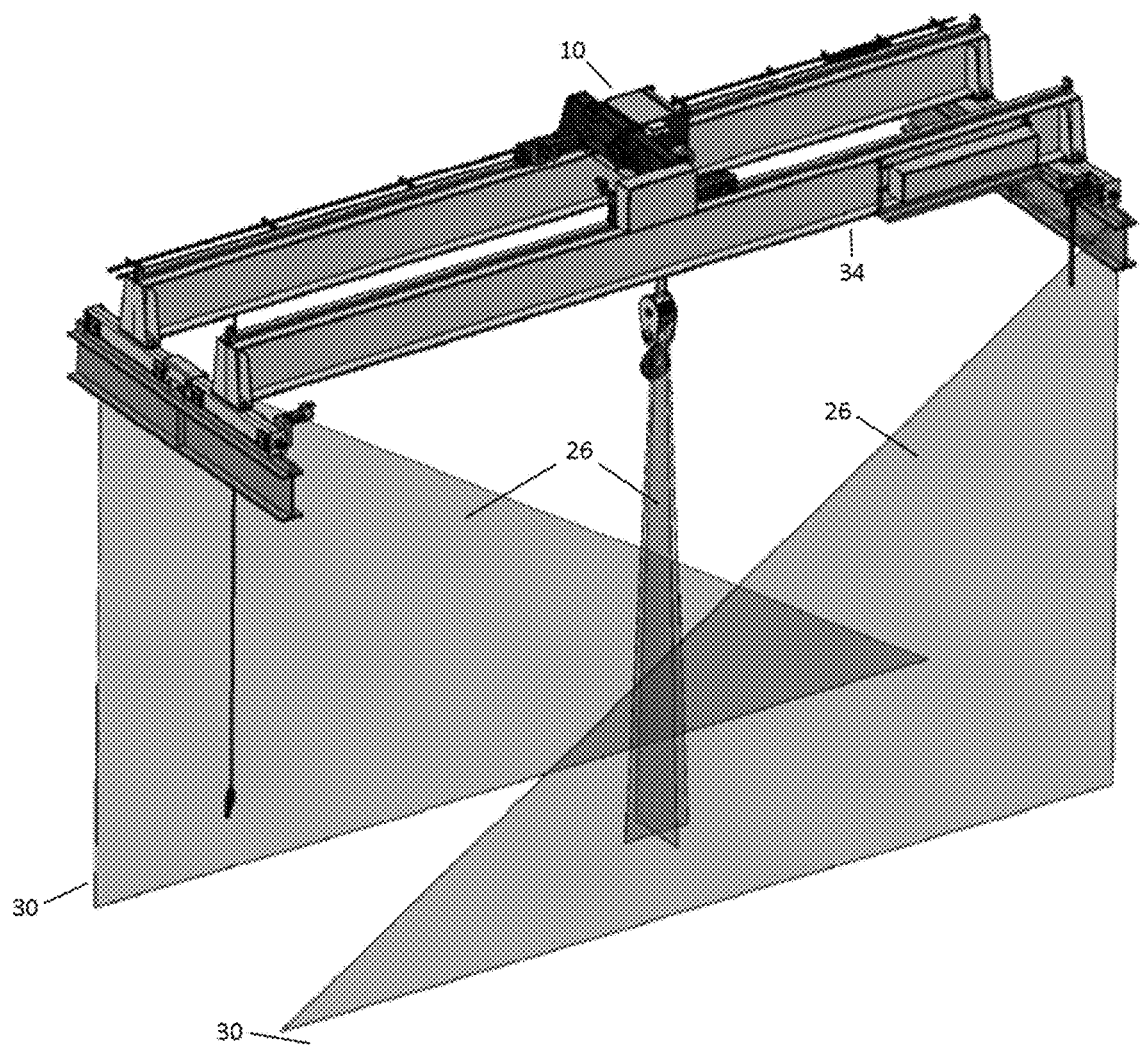
FIG. 4 is a drawing of another embodiment as used in conjunction with a designated safe zone.
Figure 5:
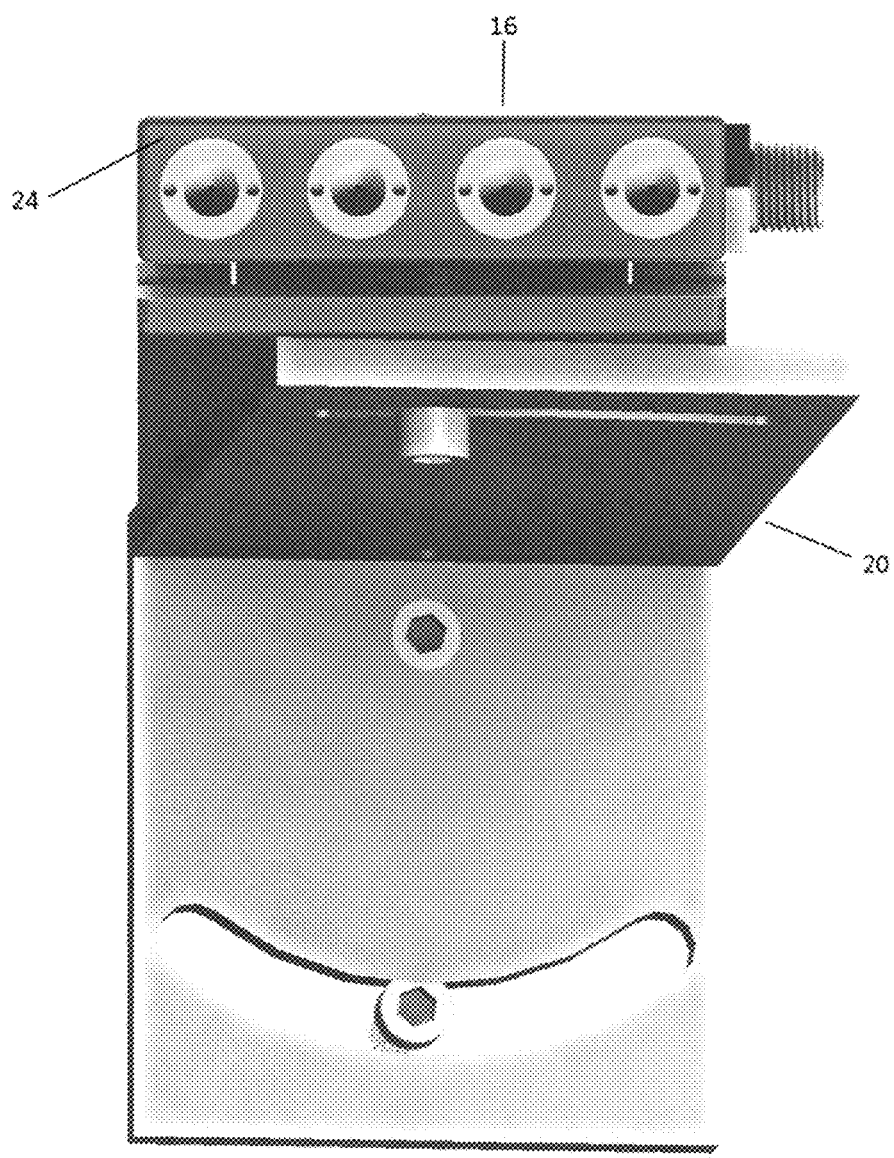
FIG. 5 is an embodiment of the invention.
Figure 6:
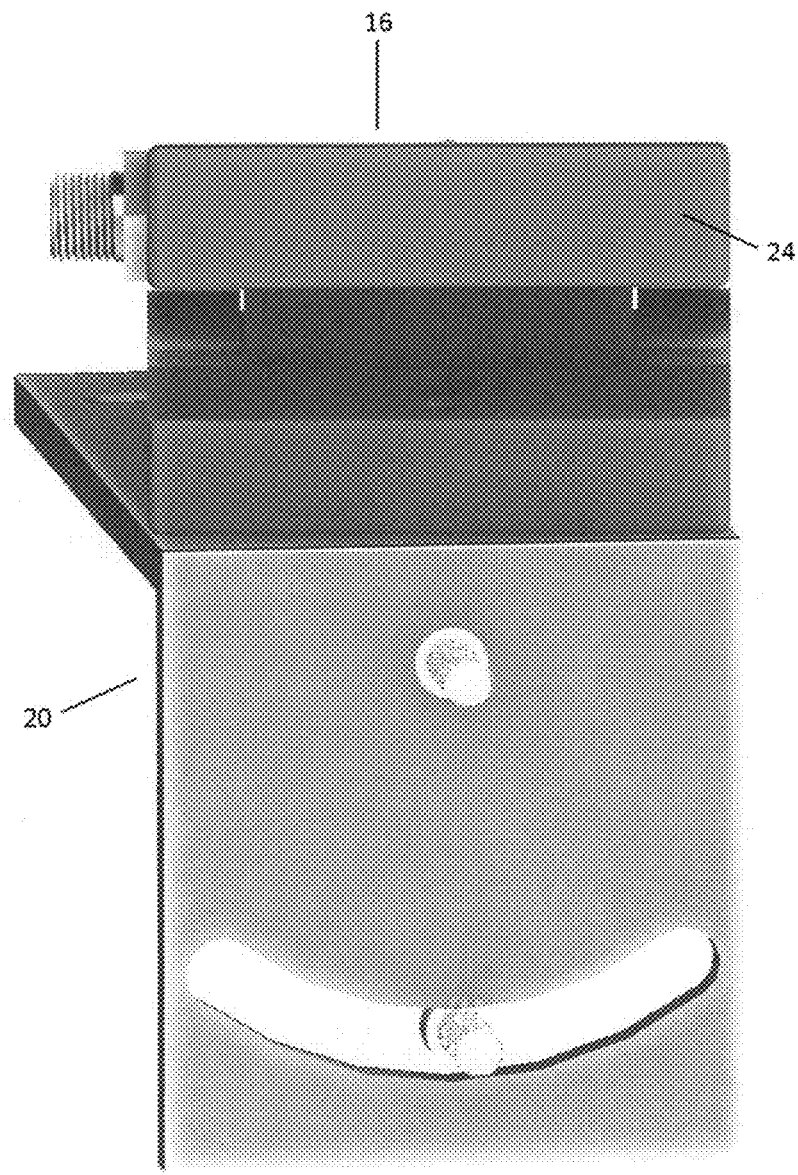
FIG. 6 is another embodiment of the invention.
Figure 7:
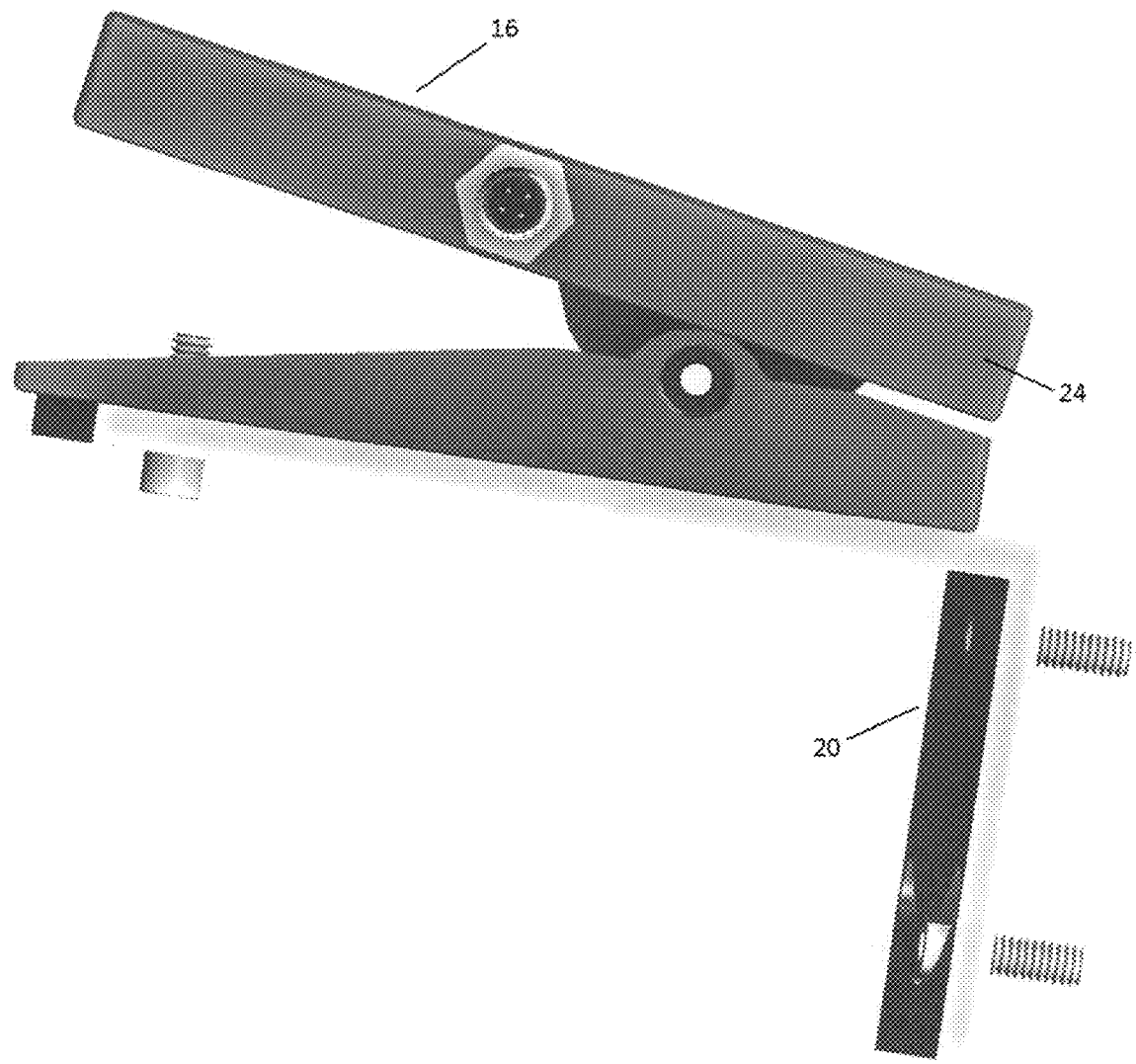
FIG. 7 is another embodiment of the invention.
Figure 8:
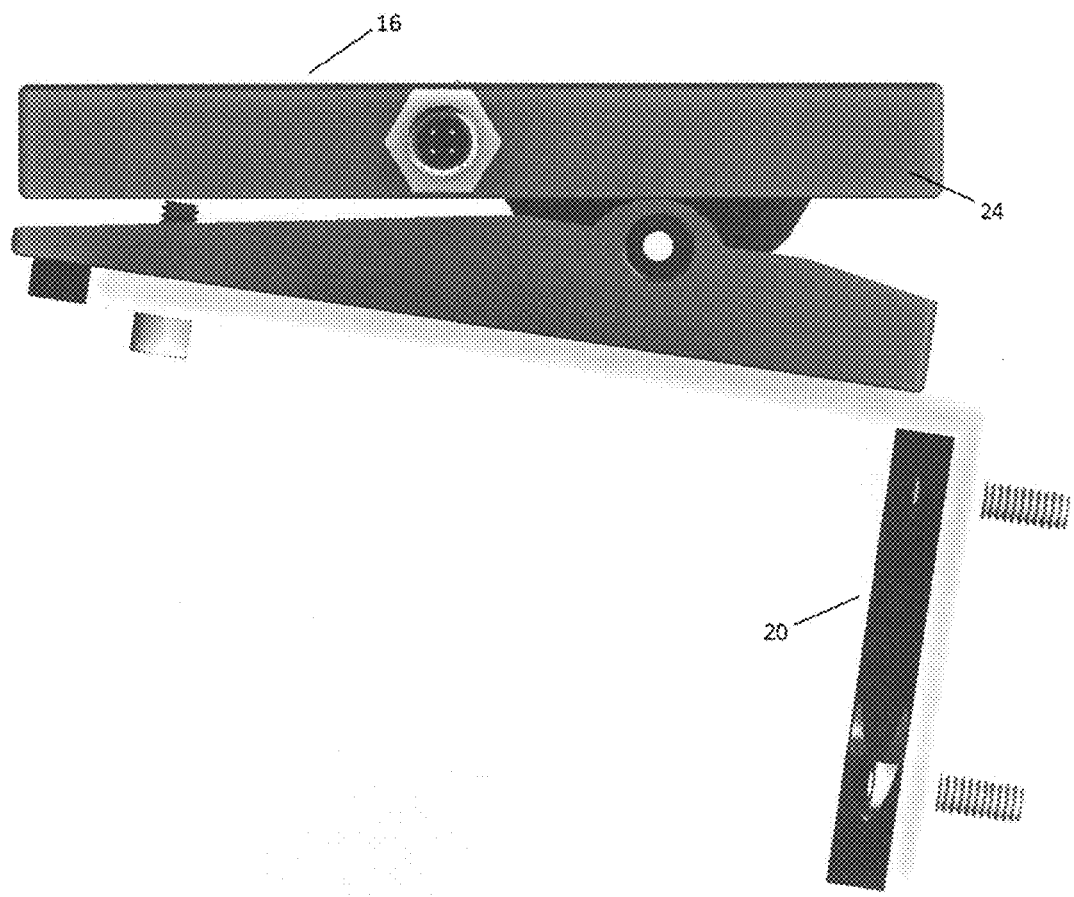
FIG. 8 is another embodiment of the invention.

FIGS. 3 and 4 illustrate one embodiment of said "Zone Control." According to this embodiment, the safety awareness lighting system kit can be mounted in static position above a known obstruction or safety zone 30 in the plant providing a laser indication projection 26 delineating the edge of the safety zone 30. If the crane operator moves a load 32 under the beam, the laser hits the load 32 giving the operator an indication that he has traversed into a safety zone 30.

With continued reference to FIGS. 3 and 4, the kits may be installed onto an existing crane's runway structure 34 to provide a laser indication projection 26 showing that the crane is in a particular position on the runway as a means of safety awareness. By way of one example, the safety awareness lighting system would have the system mounted at the end of a building that intersects with another connected building running perpendicular to it. This would allow the lasers to warn approaching equipment and personnel that a crane was at work in that area of the runway. The system may be mounted on any surface that allows for the projection of the laser onto a target surface.

According to one embodiment, the safety awareness lighting system may be connected to existing controls and used in conjunction with other crane related safety devices such as "collision avoidance" systems to provide additional support of these devices. By way of one example, these other crane related safety devices may include any other lighting fixtures, any sound related devices, or any other device that can be used in order to increase worker safety in an environment containing overhead cranes.

According to one embodiment, the safety awareness lighting system operates in concert with the crane operating system to provide a visual indication 26 of the position and/or directional movement of the crane or its components. By way of one example, the control system used to control movement of the crane or its components may be integrated with the safety awareness lighting system.

According to one embodiment, a programmable logic controller for the control system can be further configured to provide various types of output lighting enhancements, such as controlled pulse (constant flashing), varied pulse (change in speed from fast to slow) or a change in line length based on feedback from encoders mounted on the cranes drive motors. A further embodiment may allow for various types of output lighting enhancements as an independent control based upon the desired application by the crane operator.

While the present invention has been described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the present invention should not be limited to any single embodiment, but rather construed in breadth and scope in accordance with the recitations of the appended claims.

Having thus described the invention, it is now claimed:

We claim:

1. A safety lighting system for an overhead crane comprising:
   two or more laser generators capable of generating a laser signal; and
   a crane control system having a programmable logic circuit;
   wherein the two or more laser generators are integrated with the crane control system;
   wherein the two or more laser generators are operable to project a laser signal onto a surface corresponding to the position of the crane or crane components; wherein the two or more laser generators produce laser signals of at least two contrasting colors; and wherein a first laser signal of a first color represents movement of the overhead crane in a first direction and a second laser signal of a second color represents movement of the overhead crane in a second direction.

2. The safety lighting system of claim 1 wherein the two or more laser generators project a line, a series of lines, a pattern of lines, or a combination thereof, onto the corresponding surface.

3. The safety lighting system of claim 2 wherein the projected lines can comprise text or graphics.

4. The safety lighting system of claim 1 wherein at least one of the two or more laser generators further comprises a solid state generator capable of adjusting the intensity and shape of the laser output along at least a portion of the laser pathway.

5. The safety lighting system of claim 3 wherein at least one of the two or more laser generators further comprises a solid state generator capable of adjusting the intensity and shape of the laser output along at least a portion of the laser pathway.

6. The safety lighting system of claim 1 wherein the programmable logic controller further comprises a microprocessor.

7. The safety lighting system of claim 6 wherein the programmable logic controller is programmable to provide controlled pulse lighting, varied pulse lighting, variable line lengths, or customized output lighting.

8. A method for detecting entry of an object into a designated zone comprising the steps of:

a. providing a safety lighting system comprising:
   two or more laser generators capable of generating a laser signal; and
   a programmable logic circuit;
   wherein the two or more laser generators are integrated with the programmable logic circuit; wherein the two or more laser generators are operable to project a laser signal onto an associated surface; wherein the two or more laser generators produce laser signals of at least two contrasting colors; and wherein a first laser signal of a first color represents movement of the overhead crane in a first direction and a second laser signal of a second color represents movement of the overhead crane in a second direction;
b. mounting the safety lighting system in static position above the designated zone;
c. operating the safety lighting system to generate at least one beam of light illuminating at least one boundary of the designated zone;
d. detecting the illuminated boundary visually or mechanically; and
e. alerting a crane operator of having crossed the illuminated boundary of the designated zone by illumination of crane parts or the crane load by the at least one laser generator.

9. The method of claim 8 wherein the safety lighting system is mounted directly on the crane runway structure.

10. The method of claim 8 wherein the safety lighting system is mounted at an intersection of two or more crane runways.

11. The method of claim 8 wherein the at least one beam of light is projected onto the floor beneath the designated zone.

12. The method of claim 8 wherein the at least one beam of light is projected onto a wall of a building.

13. The safety lighting system of claim 1 wherein one of the at least two laser generators generates a red-line laser and a second of the at least two laser generators generates a green-line laser.

14. The safety lighting system of claim 13 wherein the red-line laser represents a distance between the overhead crane and a desired target of less than five feet and the green-line laser represents distance between the overhead crane and a desired target of five feet or greater.

15. The safety lighting system of claim 1 further comprising a moisture and dust resistant housing containing the two or more laser generators.

16. The safety lighting system of claim 15 wherein the moisture and dust resistant housing further comprises a shock and vibration isolation system.

17. A safety lighting system for an overhead crane comprising:
   two or more laser generators capable of generating a laser signal;
   a crane control system having a programmable logic circuit; and,
   a moisture and dust resistant housing;
   wherein the two or more laser generators are integrated with the crane control system; wherein the two or more laser generators are operable to project a laser signal onto a surface corresponding to the position of the crane or crane components; wherein the two or more laser generators produce laser signals of at least two contrasting colors; wherein the two or more laser generators project a line, a series of lines, a pattern of lines, or a combination thereof, onto the corresponding surface; wherein at least one of the two or more laser generators further comprises a solid state generator capable of adjusting the intensity and shape of the laser output along at least a portion of the laser pathway; and, wherein one of the at least two laser generators generates a red-line laser and a second of the at least two laser generators generates a green-line laser; wherein the programmable logic controller is programmable to provide controlled pulse lighting, varied pulse lighting, variable line lengths, or customized output lighting; and, wherein the moisture and dust resistant housing further comprises a shock and vibration isolation system; and wherein the red-line laser represents movement of the overhead crane in a first direction and the green-line laser represents movement of the overhead crane in a second direction.

18. The safety lighting system of claim 17 wherein a third laser signal of a third color represents a distance between the overhead crane and a desired target of less than five feet and a fourth laser signal of a fourth color represents a distance between the overhead crane and a desired target of five feet or greater.

* * * * *